2,956,059
ESTER-LIKE PIPERIDINE DERIVATIVES

Jany Renz and Jean-Pierre Bourquin, Basel, Switzerland, assignors to Sandoz Ltd., Basel, Switzerland No Drawing. Filed Oct. 20, 1958, Ser. No. 768,009
Claims priority, application Switzerland May 30, 1956

4 Claims. (Cl. 260—294.3)

The present invention relates to new and therapeutically useful ester-like piperidine derivatives.

The new derivatives of the present invention correspond to the formula:

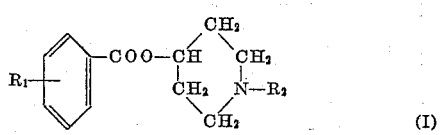

wherein $R_1$ stands for an alkoxy group containing one to four carbon atoms (e.g. methoxy, ethoxy, propoxy, etc.), an alkyl group containing one to four carbon atoms (e.g. methyl, ethyl, propyl, etc.), an —NH-alkyl group containing one to four carbon atoms (e.g. methylamino, ethylamino, propylamino, butylamino), a lower alkoxy-lower alkyl-NH— group (e.g. methoxymethylamino, methoxyethylamino, ethoxyethylamino, propoxyethylamino, methoxypropylamino, etc.), a chlorine atom or a bromine atom, and $R_2$ stands for an alkyl group containing one to four carbon atoms (e.g. ethyl, methyl, propyl, butyl).

The aforesaid new compounds I can be prepared by reacting a 1-alkyl-4-hydroxy-piperidine derivative of the formula

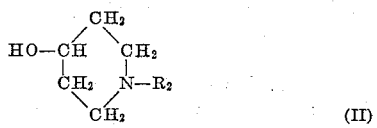

wherein $R_2$ has the previously-recited significance with the corresponding reactive functional benzoic acid derivatives of the formula:

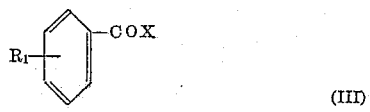

wherein $R_1$ has the previously-recited significances and X stands for chlorine or bromine or for an alkoxy group which contains one to three carbon atoms.

The process of preparing the new compounds I may be carried out for example by heating a compound II, for example 1-methyl-4-hydroxy-piperidine, with a compound of formula III, for example a substituted benzoic acid-alkyl ester, in the presence of a condensing agent, such as sodium ethylate or metallic sodium preferably to a temperature of 150–200° C., so that the aliphatic alcohol liberated in the course of the re-esterification distils off. The residue upon being subjected to fractionation under reduced pressure yields the desired end product.

Where the substituted benzoic acid derivative employed for the acylation of the 1-alkyl-4-hydroxy-piperidine is an acid halide, such for example as anisoyl chloride (p-methoxybenzoyl chloride), then the procedure is that the 1-alkyl-4-hydroxy-piperidine derivative is dissolved together with the substituted benzoyl halide in an inert organic solvent, such for example as benzene, toluene or xylene. The resultant solution of the reaction partners is then allowed to stand at room temperature, e.g. about 20 to 30° C., and/or at elevated temperature, for example in a steam bath. The formed ester, which is present as the hydrohalide, is finally liberated by the addition of an alkaline substance, such for example as sodium carbonate, and is then isolated and purified.

The hitherto-unknown ester-like piperidine derivatives I of the present invention can be distilled under reduced pressure without decomposition. At room temperature they are liquid or solid crystalline bases which form stable and physiologically tolerable salts with the various non-toxic organic and mineral acids. Thus, they form hydrohalides (hydrochlorides, hydrobromides, hydroiodides) with the hydrohalic acids, and e.g. nitrates, phosphates, benzoates, citrates, tartrates, naphthalenesulfonates, etc. with the corresponding acids.

The new compounds are distinguished by thereapeutically valuable pharmacodynamic properites. Thus, the free bases as well as their salts have a strong local anesthetic action which may be employed in surface anesthesia or in systemic anesthesia; the new compounds have a very good local tolerability and a very slight toxicity. Of outstandingly low toxicity is the N-n-butyl-anthranilic acid-(1-methyl-4-piperidyl)-ester. The compounds of the present invention are therefore useful in therapy.

In the following examples, the parts, unless otherwise indicated, are by weight. The relationship between parts by weight and parts by volume is the same as that between grams and milliliters. All temperatures are in degrees centigrade.

*Example 1*

A mixture of 40.0 parts of p-n-butoxy-benzoic acid-methylester, 88.5 parts of 1-methyl-4-hydroxy-piperidine and 1.0 part of sodium ethylate (powdered) is heated under a reflux condenser in an oil bath at a temperature of 200°. Upon termination of the distillation of the liberated methanol, the reaction mixture is cooled, digested with 500 parts by volume of acetone and filtered. The filtrate is evaporated at 50° under reduced pressure, and the so-obtained residue is distilled. The desired p-n-butoxy-benzoic acid-(1-methyl-4-piperidyl)-ester distils over at 160–165° under a pressure of 0.05 mm. Hg and has a melting point of 55–57° (after recrystallization from ethanol-water).

The monohydrochloride is obtained by dissolving the new compound in the equivalent quantity of 1-normal hydrochloric acid, evaporating the resultant solution at 50° under reduced pressure, dissolving the residue in the ten-fold quantity of absolute ethanol, and again evaporating the solution under reduced pressure at the aforesaid temperature. The resultant residue is dissolved in the ten-fold quantity of boiling absolute ethanol and then, after filtering, an equal volume of ether is added. The crystalline monohydrochloride of p-n-butoxy-benzoic acid-(1-methyl-4-piperidyl)-ester, which is thus precipitated, has a melting point of 202–204°.

*Example 2*

43.0 parts of p-n-butoxy-benzoyl chloride, dissolved in 100 parts by volume of benzene, are admixed with a solution of 23.4 parts of 1-methyl-4-hydroxy-piperidine in 100 parts by volme of benzene at room temperature, allowed to stand over night, and then heated to 80° for one hour. The reaction mixture is then evaporated to dryness at 50° under reduced pressure. The so-obtained residue is dissolved in 450 parts by volume of water and 50 parts by volume of 3-normal hydrochloric acid, after which 120 parts of solid sodium carbonate are added while cooling with ice. The oil which separates out is dissolved in 600 parts by volume of ether, and the resultant solution is dried over sodium sulfate, filtered, freed of ether at 30° under reduced pressure, and the so-obtained oily residue distilled under a pressure of 0.05 mm. Hg and at a temperature of 160–165°. After recrystallization from ethanol-water, the obtained p-n-butoxy-benzoic acid-(1-methyl-4-piperidyl)-ester melts at 55–57°.

*Example 3*

A solution of 85.3 parts of anisoyl chloride in 200 parts by volume of benzene is added to a solution of 46.0 parts of 1-methyl-4-hydroxy-piperidine in 200 parts by volume of benzene, the mixture heated to boiling for 2 hours under reflux at an oil bath temperature of 100°, and then allowed to stand over night at room temperature. The precipitated material is filtered off, dissolved in 500 parts by volume of water and, after the addition of animal charcoal, filtered. The reaction mixture is then made phenolphthalein-alkaline by the addition of about 400 parts by volume of 2-normal aqueous sodium carbonate solution while cooling with ice, and is then extracted with ether. The ether solution is evaporated, and the oily residue is distilled under a pressure of 11 mm. Hg. The desired anisic acid-(1-methyl-4-piperidyl)-ester distills over at 195° under a pressure of 11 mm. Hg.

After evaporating to dryness a solution of the ester in the equivalent quantity of 1-normal hydrochloric acid at 50° under reduced pressure, and dissolving the residue in the four-fold quantity of boiling absolute ethanol, the hydrochloride of anisic acid-(1-methyl-4-piperidyl)-ester is precipitated in crystalline form by the addition of the ten-fold quantity of ether. The hydrochloride melts at 222–224°.

*Example 4*

A solution of 40.4 parts of p-ethoxybenzoyl chloride in 100 parts by volume of benzene is added to a solution of 23.0 parts of 1-methyl-4-hydroxy-piperidine in 100 parts by volume of benzene. After heating to boiling for 2 hours under reflux, the reaction mixture is allowed to stand over night at room temperature. The substance which precipitates out is dissolved in 400 parts by volume of water and, after the addition of animal charcoal is filtered, then rendered phenolphthalein-alkaline with about 225 parts by volume of 2-normal aqueous sodium carbonate solution while cooling with ice, and then extracted with ether. After the dried ether solution is evaporated, the obtained oily residue is distilled. The desired p-ethoxy-benzoic acid-(1-methyl-4-piperidyl)-ester boils at 200° under a pressure of 11 mm. Hg.

The corresponding hydrochloride is prepared by dissolving the ester in the equivalent quantity of 1-normal hydrochloric acid, evaporating the resultant solution to dryness at 50° under reduced pressure, dissolving the obtained residue in the three-fold quantity of boiling absolute ethanol with addition of animal charcoal, filtering, and adding the ten-fold quantity of ether to the filtrate, whereupon the hydrochloride of p-ethoxy-benzoic acid-(1-methyl-4-piperidyl)-ester crystallizes out; melting point 219–221°.

*Example 5*

A solution of 74.0 parts of p-toluoyl chloride in 200 parts by volume of benzene is added to a solution of 46.0 parts of 1-methyl-4-hydroxy-piperidine in 200 parts by volume of benzene, the mixture heated to boiling under reflux for 2 hours and then allowed to stand over night. The substance which is thus precipitated is filtered off, dissolved in 700 parts by volume of water and, while cooling with ice, is rendered phenolphthalein-alkaline with about 400 parts by volume of 2-normal aqueous sodium carbonate solution. The formed ester is extracted with ether, the ether extract is dried over sodium sulfate and is then evaporated under reduced pressure. The obtained oily residue is distilled. The desired p-toluic acid-(1-methyl-4-piperidyl)-ester boils at 172° under a pressure of 11 mm. Hg.

A solution of the ester in the equivalent quantity of 1-normal hydrochloric acid is evaporated to dryness at 50° under a pressure of 11 mm. Hg, the residue is dissolved in the six-fold quantity of boiling absolute ethanol, filtered, and the thirty-fold quantity of ether added to the filtrate, whereupon the hydrochloride of p-toluic acid-(1-methyl-4-piperidyl)-ester crystallizes out; melting point 211–213°.

*Example 6*

A solution of 84 parts of p-chloro-benzoyl chloride in 200 parts by volume in benzene is added to a solution of 46.0 parts of 1-methyl-4-hydroxy-piperidine in 200 parts by volume of benzene, the mixture heated to boiling under reflux for 2 hours, and then allowed to stand at room temperature over night. The precipitate is then filtered off, dissolved in 700 parts by volume of water at 40°, the obtained solution filtered after the addition of animal charcoal, and the filtrate made alkaline with about 400 parts by volume of 2-normal of aqueous sodium carbonate solution. The precipitated p-chloro-benzoic acid-(1-methyl-4-piperidyl)-ester is filtered off and recrystallized from the ten-fold quantity of ethanol; melting point 77–79°.

The so-obtained ester is dissolved in the four-fold quantity of 1-normal hydrochloric acid, and the solution is evaporated to dryness at 50° under reduced pressure, after which the residue is dissolved in the three-fold quantity of boiling absolute ethanol with the addition of animal charcoal, the obtained solution is then filtered, and the filtrate is diluted with the ten-fold quantity of ether, whereupon the hydrochloride of p-chloro-benzoic acid-(1-methyl-4-piperidyl)-ester precipitates in crystalline form; melting point 222–224°.

By replacing the p-chloro-benzoyl chloride by the corresponding quantity of p-bromo-benzoyl chloride and otherwise proceeding as above set forth, the corresponding p-bromo-benzoic acid-(1-methyl-4-piperidyl)-ester and its hydrochloride are obtained.

*Example 7*

A suspension of 13.2 parts of p-n-butylaminobenzoyl-chloride-hydrochloride in 75 parts by volume of benzene is stirred into a solution of 5.6 parts of 1-methyl-4-hydroxy-piperidine in 75 parts by volume of benzene, and the mixture heated to boiling under reflux for 2 hours. The mixture is cooled externally with ice water down to a temperature of 20° and the benzene is decanted. The residue is dissolved in 150 parts by volume of water to which several parts by volume of dilute hydrochloric acid have been added, animal charcoal is added to the solution which is then filtered and the filtrate made phenolphthalein-alkaline with about 250 parts by volume of 2-normal aqueous sodium carbonate solution. The substance which precipitates out is dissolved in ether, and the obtained solution is dried over sodium sulfate and is then evaporated. The residue is distilled, whereupon the desired p-n-butylamino-benzoic acid-(1-methyl-4-piperidyl-ester distils at 185–195° under a pressure of 0.05 mm. Hg. The crystalline solidified distillate is recrystallized from ethanol; melting point 109–111°.

*Example 8*

A mixture of 19.0 parts of p-n-butylamino-benzoic acid-ethylester, 39.5 parts of 1-methyl-4-hydroxy-piperidine and 1.0 part of powdered sodium ethylate is heated under a reflux condenser for 2 hours in an oil bath at 200°. When all the evolved ethanol has been distilled off, the reaction mixture is cooled, digested with 250 parts by volume of acetone and filtered. The filtrate is evaporated at 50° under reduced pressure, after which the so-obtained residue is distilled. The desired p-n-butyl-amino-benzoic acid-(1-methyl-4-piperidyl)-ester distils over at 185–195° under a pressure of 0.05 mm. Hg, and has a melting point of 109–111°.

The corresponding monohydrochloride is prepared by dissolving the new ester in the equivalent quantity of 1-normal hydrochloric acid and evaporating the solution at 50° under reduced pressure. The obtained residue is then dissolved in the ten-fold quantity of boiling acetone, the solution is filtered and the ten-fold quantity of ether is added to the filtrate. The precipitated crystalline monohydrochloride of p-n-butylamino-benzoic acid-(1-methyl-4-piperidyl)-ester melts at 177–179°.

*Example 9*

A suspension of 7.3 parts of p-methoxyethylamino-benzoyl chloride hydrochloride in 40 parts by volume of benzene is added to a solution of 3.1 parts of 1-methyl-4-hydroxypiperidine in 40 parts by volume of benzene, and the mixture is heated to boiling for 2 hours under reflux. After cooling the reaction mixture, the benzene is decanted, the residue is dissolved in 100 parts by volume of water, the solution is filtered after the addition thereto of animal charcoal, the filtrate is rendered phenolphthalein-alkaline by means of about 100 parts by volume of 2-normal aqueous sodium carbonate solution and while cooling with ice, and the obtained oily substance is taken up in chloroform. The chloroform extract is dried with sodium sulfate, the chloroform is evaporated off at 50° under reduced pressure, and the residue is distilled in a high vacuum. The desired p-methoxy-ethylamino-benzoic acid-(1-methyl-4-piperidyl)-ester boils at 203° under a pressure of 0.15 mm. Hg.

*Example 10*

A mixture of 28.6 parts of p-methoxyethylaminobenzoic acid-ethylester, 50.0 parts of 1-methyl-4-hydroxypiperidine and 1.5 parts of powdered sodium ethylate is heated for 2 hours in an oil bath at 200° and under a reflux condenser. As soon as no more ethanol distils, the mixture is cooled, digested with 350 parts by volume of acetone, and filtered. The filtrate is evaporated at 50° under reduced pressure, and the residue is distilled. The desired p-methoxyethylamino-benzoic acid-(1-methyl-4-piperidyl)-ester boils at 203° under a pressure of 0.15 mm. Hg.

The corresponding monohydrochloride is prepared by dissolving the ester in the equivalent quantity of 1-normal hydrochloric acid, and then evaporating the solution to dryness at 50° under reduced pressure. The so-obtained residue is dissolved in the twenty-fold quantity of boiling ethanol-acetone (1:3), after which the twenty-fold quantity of ether is added, thereby precipitating the monohydrochloride of p-methoxyethylamino-benzoic acid-(1-methyl-4-piperidyl)-ester; melting point 169–171°.

*Example 11*

A mixture of 65.2 parts of N-n-butyl-anthranilic acid-ethylester (o-n-butylamino-benzoic acid-ethylester) (B.P. 160°/12 mm. Hg prepared from N-n-butyl-anthranilic acid [M.P. 80–81°] by esterification with absolute ethanol in the presence of concentrated sulfuric acid), 134.5 parts of 1-methyl-4-hydroxy-piperidine and 7.0 parts of powdered sodium ethylate is heated for 2 hours in an oil bath at 200° and under a reflux condenser. As soon as no more ethanol distils, the mixture is cooled, digested with 700 parts by volume of ether, and filtered. The filtrate is evaporated, and the residue then distilled. After removing excess 1-methyl-4-hydroxy-piperidine under a pressure of 15 mm. Hg, a preliminary distillate—which passes over up to 142° under a pressure of 0.006 mm. Hg—is separated. The main fraction, distilling at 142–144° at the last-mentioned pressure, is collected. The analytically pure N-n-butyl-anthranilic acid-(1-methyl-4-piperidyl)-ester thus obtained has a boiling point of 143° under a pressure of 0.006 mm. Hg.

The corresponding monohydrochloride can be prepared by concentrating a solution of 40.62 parts of the free base in 140.5 parts by volume of normal hydrochloric acid under reduced pressure to produce a syrup. The latter is dissolved in 250 parts by volume of isopropanol and is then again evaporated under reduced pressure in order to remove residual water. The residue of this evaporation is recrystallized from 250 parts by volume of boiling isopropanol. The analytically pure monohydrochloride of N-n-butyl-anthranilic acid-(1-methyl-4-piperidyl)-ester has a constant melting point of 169–171°.

*Example 12*

A mixture of 54.3 parts of O-n-butyl-salicylic acid-methylester (o-n-butoxy-benzoic acid-methylester) (B.P. 141°/10 mm. Hg, prepared from salicylic acid-methylester by etherification with n-butyl bromide in acetone in the presence of potassium carbonate), 119 parts of 1-methyl-4-hydroxy-piperidine and 4.4 parts of powdered sodium ethylate is heated for 2 hours in an oil bath at 200° and under a reflux condenser. As soon as no more methanol distils, the mixture is cooled, digested with 750 parts by volume of acetone, and filtered. The filtrate is evaporated, and the residue then distilled. After removing excess 1-methyl-4-hydroxy-piperidine under a pressure of 10 mm. Hg, a preliminary distillate—which passes over up to 147° under a pressure of 0.01 mm. Hg—is separated. The main fraction, distilling at 147–153° at the last-mentioned pressure, is collected. The analytically pure O-n-butyl-salicylic acid-(1-methyl-4-piperidyl)-ester thus obtained has a boiling point of 150°/0.01 mm. Hg.

The corresponding hydrochloride is prepared by adding ethanolic HCl to a solution of 17.0 parts of the free base in 95 parts by volume of absolute ethanol until a reaction which is acid to congo is achieved. After the addition of 150 parts by volume of ether, the desired hydrochloride crystallizes out. By recrystallization from 20 parts by volume of absolute ethanol and 100 parts by volume of ether, there is obtained the analytically pure hydrochloride of O-n-butyl-salicylic acid-(1-methyl-4-piperidyl)-ester having a constant melting point of 147–149°.

Although the piperidine used in the preceding examples is, for illustrative purposes, the 1-methyl-4-hydroxy-piperidine—this being the preferred piperidine—it will be understood that the other 1-lower alkyl-4-hydroxy-piperidines may in like manner be employed in lieu thereof.

The present application is a continuation-in-part of application Serial No. 661,597, filed May 27, 1957, now abandoned.

Having thus disclosed the invention, what is claimed is:
1. p-n-Butoxy-benzoic acid - (1-methyl-4-piperidyl)-ester.
2. p-n-Butylamino benzoic acid-(1 - methyl - 4 - piperidyl)-ester.
3. N-n-butyl - anthranilic acid-(1-methyl-4-piperidyl)-ester.
4. O-n-butyl-salicylic acid-(1-methyl - 4 - piperidyl)-ester.

References Cited in the file of this patent
UNITED STATES PATENTS

| | | |
|---|---|---|
| 2,507,449 | Martin et al. | May 9, 1950 |
| 2,606,205 | Shelton et al. | Aug. 5, 1952 |
| 2,850,497 | Ehrhart et al. | Sept. 2, 1958 |

FOREIGN PATENTS

| | | |
|---|---|---|
| 241,767 | Great Britain | Oct. 29, 1925 |

OTHER REFERENCES

Bolyard et al.: J.A.C.S., vol. 51 (1929), pp. 923–928.
Burtner et al.: J.A.C.S., vol. 65 (1943), p. 263.
Moore, M.B.: J. Am. Pharm. Assoc., vol. 33, pp. 194 and 195.